(12) United States Patent
Robichaux et al.

(10) Patent No.: US 8,091,930 B2
(45) Date of Patent: Jan. 10, 2012

(54) TUBULAR CONNECTION FLOATING SHOULDER RING

(76) Inventors: Lee M Robichaux, Lafayette, LA (US); Lee J Matherne, Lafayette, LA (US)

(*) Notice: Subject to any disclaimer, the term of this patent is extended or adjusted under 35 U.S.C. 154(b) by 208 days.

(21) Appl. No.: 12/383,187

(22) Filed: Mar. 20, 2009

(65) Prior Publication Data

US 2010/0237612 A1  Sep. 23, 2010

(51) Int. Cl.
*F16L 25/00* (2006.01)

(52) U.S. Cl. ........................ 285/333; 285/374

(58) Field of Classification Search .............. 285/398, 285/397, 383, 355, 390, 333, 334, 369, 370, 285/371

See application file for complete search history.

(56) References Cited

U.S. PATENT DOCUMENTS

| | | | | |
|---|---|---|---|---|
| 354,560 A * | 12/1886 | Levier | | 285/39 |
| 1,568,993 A * | 1/1926 | Newsom | | 285/55 |
| 2,040,766 A * | 5/1936 | Chappell | | 285/55 |
| 2,341,670 A * | 2/1944 | Stinson | | 285/334 |
| 2,487,241 A * | 11/1949 | Hilton | | 285/334.2 |
| 2,805,872 A * | 9/1957 | Routh | | 285/55 |
| 3,062,568 A * | 11/1962 | Andresen et al. | | 285/333 |
| 3,339,945 A * | 9/1967 | McCrory, Jr. et al. | | 285/55 |
| 3,427,050 A * | 2/1969 | Krieg | | 285/55 |
| 3,479,059 A * | 11/1969 | Taylor et al. | | 285/55 |
| 3,574,357 A * | 4/1971 | Alexandru et al. | | 285/47 |
| 3,620,555 A * | 11/1971 | Hinds et al. | | 285/55 |
| 4,621,838 A * | 11/1986 | Kneidel et al. | | 285/41 |
| 4,679,831 A * | 7/1987 | Kielminski | | 285/332.2 |
| 4,709,946 A * | 12/1987 | Hunter | | 285/55 |
| 4,856,828 A * | 8/1989 | Kessler et al. | | 285/334.1 |
| 5,048,871 A * | 9/1991 | Pfeiffer et al. | | 285/39 |
| 5,129,689 A * | 7/1992 | Newski et al. | | 285/333 |
| 5,263,748 A * | 11/1993 | Carstensen | | 285/333 |
| 5,895,079 A * | 4/1999 | Carstensen et al. | | 285/333 |
| 6,811,187 B2 * | 11/2004 | Otten et al. | | 285/93 |
| 6,899,356 B2 | 5/2005 | Slack et al. | | |
| 7,108,063 B2 * | 9/2006 | Carstensen | | 166/241.2 |
| 7,731,246 B2 * | 6/2010 | McLaughlin | | 285/355 |
| 7,753,416 B2 * | 7/2010 | Mazzaferro et al. | | 285/333 |
| 2004/0036287 A1 * | 2/2004 | Trivelli | | 285/333 |
| 2008/0252074 A1 * | 10/2008 | Ohngren et al. | | 285/333 |
| 2010/0032166 A1 * | 2/2010 | Slack | | 166/378 |

* cited by examiner

*Primary Examiner* — Aaron Dunwoody
(74) *Attorney, Agent, or Firm* — Ted M. Anthony

(57) ABSTRACT

A floating shoulder ring is arranged to occupy the J-space between pin ends of coupled pipe sections. The length of the ring is arranged to allow the pipe connection to approach the specified torque for shoulderless connections before the ring begins to function as an abutment between the approaching pipe ends. The torque accepted by the ring limits the radial force imposed by tapered threads on both pipe and coupling. The ring is provided with modified threads on the outer surface to engage the inner threads of the coupling, in the J-space, to retain the ring in the coupling during handling in preparation for assembly into a pipe string. The modified threads yield axially when substantially forced. Threads that slip axially, non-destructively, and threads that deform under sufficient axial force are provided.

6 Claims, 3 Drawing Sheets

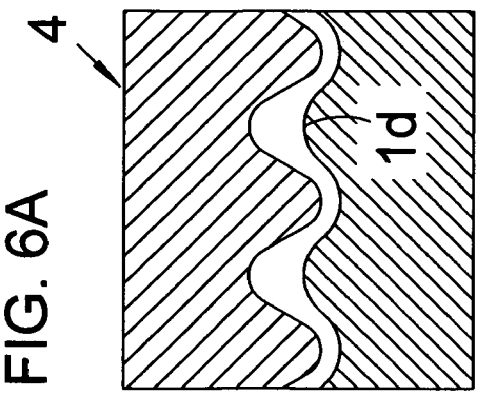
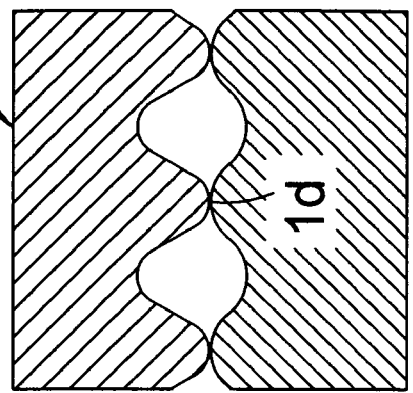
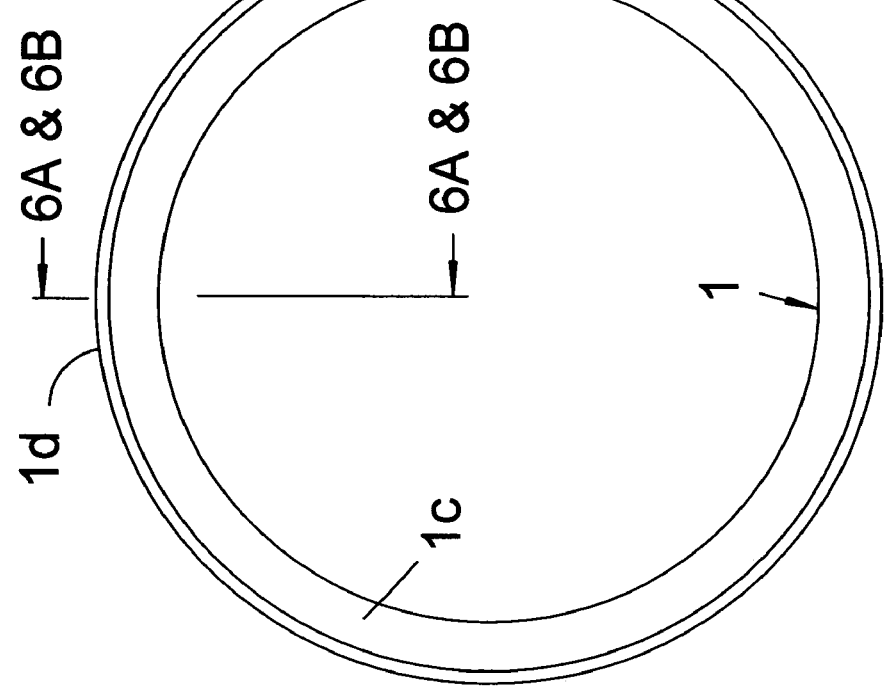
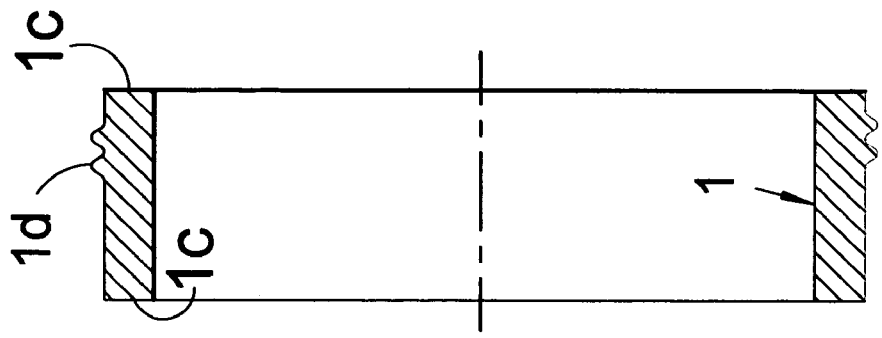

TUBULAR CONNECTION FLOATING SHOULDER RING

FIELD OF THE INVENTION

This invention relates to floating shoulder rings used between the ends, within the coupling, of taper threaded, shoulderless, pipe connections. Generally, but not in a limiting sense, the shoulder ring may be used in pipe strings installed in wells.

BACKGROUND OF THE INVENTION

Tubulars used to drill and complete wells are typically joined by threaded connections. The most widely used connections, in casings and tubing, have tapered threads without shoulders. Pipe connections depend upon sufficient torque to seal and secure the pipe sections in series. The couplings are of somewhat larger diameter than the joined pipe ends and have tapered box threads to receive the tapered, threaded, ends of the joined pipe sections. The threaded pipe ends are called pins.

Common surface piping connectors are usually called collars but collars in the well drilling industry are the heavy, thick walled, pipe situated near the bit that provides ballast weight to load a drill bit. The term "couplings" will be used herein to define the short tube that joins two sections of pipe.

Well bores are seldom straight. They often jog laterally, to some degree, quite often. Pipe is normally straight relative to well bores and moving a straight pipe through less than straight well bores takes some force. Well bores are usually sized for the pipe to move along the well bores with manageable forces. Very often, the pipe strings have some cutting structure at the lower end. To negotiate a jog in the well bore they are often rotated to ease the downward movement, cutting some formation as necessary. That rotation will often take more torque than the specification torque for the connection process. That excess torque may further drive the pin threads into the couplings. There is a need to allow the couplings to accept more torque without further running of the threads.

The most widely used pipe connections probably are the American Petroleum Institute (API) standard 8-round (LTC or STC) connections and the industry standard coupled buttress (BTC) connections. The related couplings have threads that advance into the coupling from both ends and meet in the middle of the coupling with little or no smooth cylindrical bore remaining.

Pipe strings extending into wells that have considerable deviation from vertical are often rotated, with or without cutting structure on the lower end, as they are lowered into wells to enhance the movement into the wells.

The torque required to rotate the pipe when many sections are assembled may exceed the acceptable torque involved in assembling the pipe string connections. In such cases, again, the threads may advance farther into the couplings, often to a destructive extent. Recently, more casing strings are fitted with cutting structure at the lower end to power through bridges and to deepen drilled wells.

Recently, well drilling is involving more use of the Casing Drilling System (CDS) in which usable rotating torque is reflected in well cost reduction. A rather large part of the well may be drilled with the casing string carrying a drill head, or equivalent. The cost reduction may diminish if shouldered pipe connections have to be used to carry the increased torque.

Pipe strings are often constructed with shoulders. Such shoulders abut and cause a sharp rise in the torque required to further advance the threads. Such shouldered connections may take the pipe string rotating torque and avoid damage to the connections. Such shouldered pipe connections increase the cost of a pipe string.

There is a need to enhance the ability of tapered shoulderless threads to accept increased torque without consequent damage. With an increase in the ability of shoulderless connections to accept pipe rotating torque many more wells can be completed with the more economical, and simpler, threaded arrangements, without shoulders.

It is desirable to extend the usefulness of the more economical pipe connections by using a shouldering ring that allows the ends of the tapered threaded pipe sections to engage a shoulder to prevent pipe rotating torque from overloading the threads in both boxes and pins.

The center of the coupling, between pipe ends, has been defined as the J-space. The diminishing threads in the center of the coupling can be used to confine a floating shoulder ring. The shoulder ring needs to remain in place during handling of the pipe but should be able to float when two pipe ends shorten the J-space during thread make-up.

A short ring having an inner diameter approximating the pipe bore and an outer diameter approximating the radial dimension available in the coupling can engage both ends of pipe entering the coupling boxes and accept axial thrust that the make-up of the connection produces. Excess torque that would damage the threads is accepted by the floating ring and reduces the stress that would otherwise distort the threads and related boxes and pins. The ring can provide sealing abutments, against the pipe ends, that can enhance the differential pressure acceptable by the connection. This invention addresses that objective.

A pipe section normally has one coupling, ideally bucked to specification, before it is introduced to the pipe string assembly area which is normally at the rotary table. It is also desirable to have the floating torque ring installed before it is introduced to the assembly area. The torque ring needs the ability to stay in place during the pipe handling. There is often shock to the pipe section while it is prepared for assembly in the pipe string. This invention addresses that objective.

The torque rings can be held in place by threads on their outer surface that mate with the threads in the coupling. The threads approaching the center of the coupling, from both ends, are of the same pitch and lay. When they meet in the middle, however, they are not normally in axial registry. The threads on the ring, then, need to engage only the threads proceeding from the coupling end receiving the ring.

The ring axial center should be quite close to the axial center of the coupling, considering the tolerances involved. On the eight thread standard, about seven total threads should be exposed between the pipe ends of the assembled connection. Almost four threads of the ring entry end of the coupling should be exposed beyond the end of the pipe when assembly is complete. Two complete threads on the end of the ring toward the open end of the coupling could secure the ring during handling. The number of exposed threads may vary for different sizes of pipe involved.

When the pipe sections are delivered to the rig site, the couplings are usually bucked on to a pipe section to specifications. If so, the couplings would not turn farther on to the mated pipe section when the final pipe section is torqued to specification at the rig. Unfortunately, that is not always the case. Some couplings may turn farther onto their mated pipe thread when the last pipe section is properly connected. Such events would push the installed ring axially. The ring, if it is already bound between the pin ends might not back away along the engaged coupling threads. The threads might be forced and cause damage of unpredictable consequence. There is a need for the threads to yield axially without damage. When the second pipe section is inserted into the box of the coupling, the threads on the ring no longer need to function. The threads can be of such construction that they can hold the ring in place as required until loaded, then fail harmlessly. Failing harmlessly means that the connection is not compromised by the failure of the threads on the sleeve. This invention addresses that problem.

If conditions change and the couplings no longer run farther onto the pipe string when the last pipe section is properly made up into the coupling there will be no need for threads on the ring that harmlessly yield axially. Normal thread forms can be used. That condition is anticipated by, and is within the scope of the claims.

When shoulderless pipe connections are assembled to specification the axial space between the pipe ends has substantial variance due to allowed tolerances. The floating shoulder ring can be supplied in a number of different lengths such that a measurement of the mating parts awaiting assembly can suggest an ideal length to select from the varieties on hand.

The shoulder ring with shallow, well rounded, threads has been bench tested in the worst expectable situation, after both pin ends have engaged the ring and the coupling runs farther onto the originally installed pipe section. The shallow, rounded, threads on the ring were heard to slip a thread. After removing the last pin installed, the ring could be easily removed by hand, with some backward rotation of the ring. The slip of the ring past one, or more, thread qualified as a harmless failure of the thread on the ring.

In some cases, depending somewhat upon the size of the pipe involved, the ring tends to swage radially inward when sufficient axial loads are imposed by the pin being rotated into the coupling. In such cases, the end, or ends, of the ring can be shaped slightly conical and opening outward to prevent the distortion of the ring. That is anticipated by and is inherent in the claims.

SUMMARY OF THE INVENTION

A floating shoulder ring is arranged to occupy the J-space between pin ends of coupled pipe sections. The length of the ring is arranged to allow the pipe connection to approach the specified torque for shoulderless connections before the ring begins to function as an abutment between the approaching pipe ends. The torque accepted by the ring limits the radial force imposed by tapered threads on both pipe and coupling. The ring is provided with threads, or modified thread forms, on the outer surface that will, to some extent, engage the inner threads of the coupling, in the J-space, to retain the ring in the coupling during handling in preparation for assembly into a pipe string.

Three exemplary, harmlessly yielding, thread forms are provided. They are harmless in that their destruction, or act of yielding, will not impair the quality of the connection involved. The few thread forms presented are some of the possible forms.

These and other objects, advantages, and features of this invention will be apparent to those skilled in the art from a consideration of this specification, including the attached claims and appended drawings.

BRIEF DESCRIPTION OF DRAWINGS

In the exemplary drawings, presenting a few selected options, wherein like features have like captions.

FIG. 4 is a side view, sectioned, of the floating shoulder ring.

FIG. 5 is an end view along the axis of the floating ring.

FIGS. 6A and 6B are enlarged sections through the mating threads of the floating ring and the coupling.

DETAILED DESCRIPTION OF DRAWINGS

Figure 1:
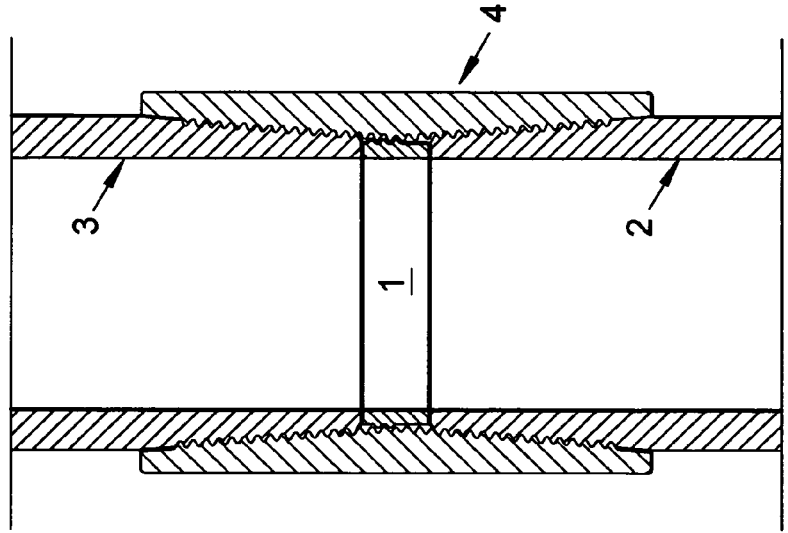
FIG. 1 is a side view of a common pipe connection, sectioned, with the floating shoulder ring in place.

In the drawings, depicting some selected structure of the many variations that may be employed by the novel features, FIG. 1 shows a typical pipe connection with the floating shoulder ring 1 in place, within the coupling 4 between the ends of the joined pins 2 and 3. The connection is shown complete, meaning that prescribed assembly make-up torque has been applied.

Figure 2:
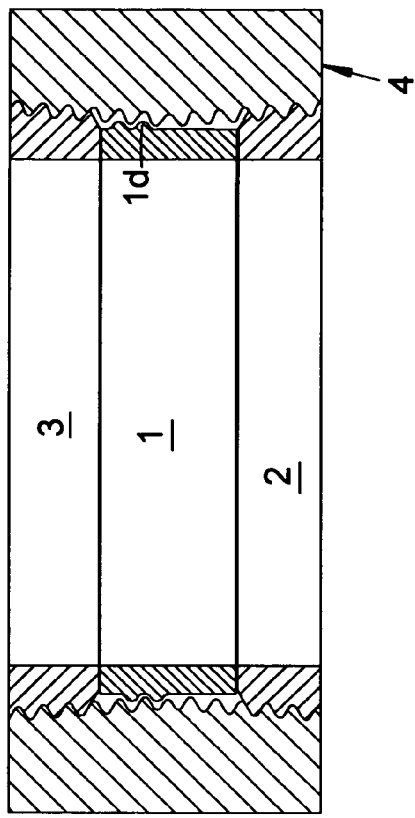
FIG. 2 is a portion of the connection of FIG. 1, rather enlarged.

FIG. 2 shows a fragment of the assembly shown in FIG. 1, rather enlarged. The floating shoulder ring 1 comprises metal ring 1 with modified threads 1d on the outer surface. It is situated in the so-called J-space. The threads 1d are of such diameter, contour and shape that, when axially forced, will slip axially over mating threads in coupling 4 causing allowable material strain but only acceptable, if any, metal displacement.

Figure 3:
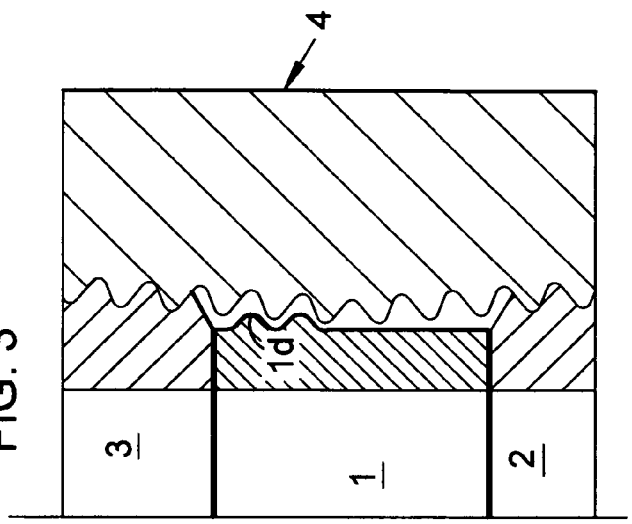
FIG. 3 is a portion of the area shown by FIG. 2, further enlarged.

FIG. 3 shows a rather enlarged section cut through one side of FIG. 2 showing metal ring 1 with the threads 1d on the outer surface.

FIG. 4 shows a side view of ring 1, in section. Generally planar surfaces 1c are the ends of the ring 1.

FIG. 5 shows an end view of the floating ring, viewed along the axis of the floating ring.

FIGS. 6A and 6B are taken along line 6-6, and show the axial thread slippage allowed by the modified threads 1d. The threads are not only shallow but are well rounded in the area of expected surface loading when slippage occurs. The best thread shape can be determined by experiment and testing. A fragment of coupling 4 is shown associated.

Figure 7:
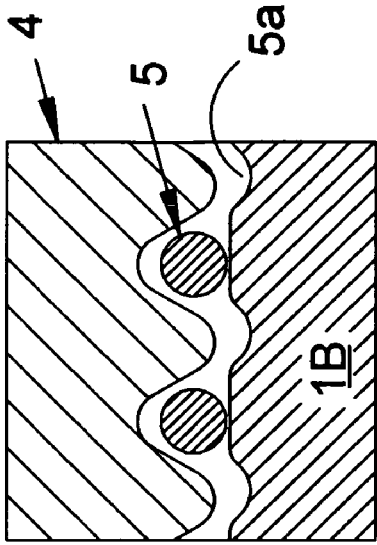
FIGS. 7 and 8 show a non-destructive thread substitute on the scale and aspect of FIG. 6A.
Figure 8:
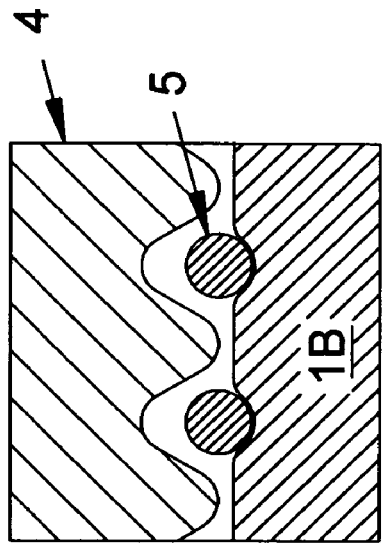

FIGS. 7 and 8 show a coil spring 5 carried in thread-like grooves 5a of the ring, now captioned 1B. Sufficient axial thrust causes the spring 5 to rise from the grooves to be carried axially in the threads of the coupling 4. The spring will hold the ring in place in the coupling until displaced by axial force caused by the coupling turning on the pipe section onto which it was not properly bucked up.

Figure 9:
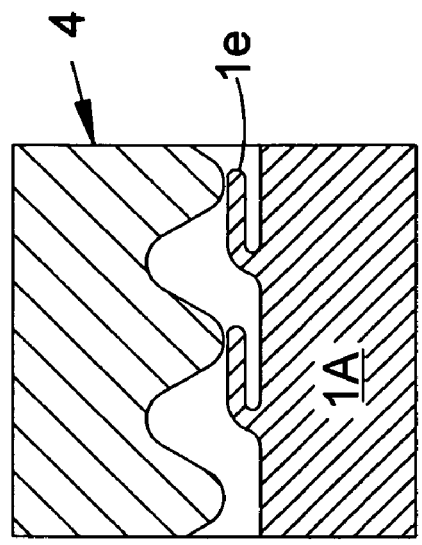
FIGS. 9 and 10 show an alternate thread form that is harmlessly destructive when forced.
Figure 10:
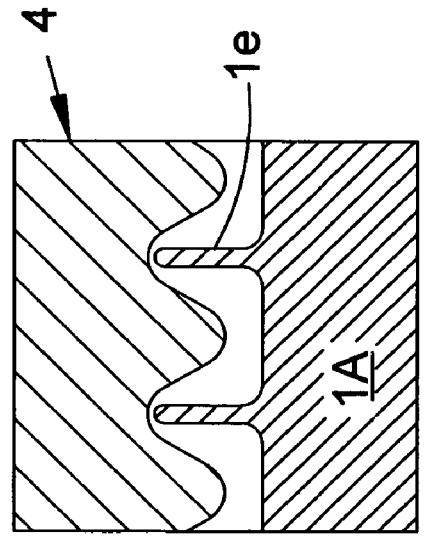

FIGS. 9 and 10 show a weak thread form 1e on the ring, now captioned 1A, which will hold enough load to retain the ring in the coupling but will be bent by greater axial loads. There is clearance about the base of the thread form to receive the bent thread.

When the couplings are properly bucked up on the attached pipe section, the coupling will not proceed to turn farther onto the pipe string when the last pipe stand is assembled onto the pipe string, regular threads can be used on the floating ring and no axial displacement of the floating ring in the connector should occur. That is anticipated by, and is within the scope, of the claims.

From the foregoing, it will be seen that this invention is one well adapted to attain all of the ends and objects hereinabove set forth, together with other advantages which are obvious and which are inherent to the apparatus.

It will be understood that certain features and sub-combinations are of utility and may be employed without reference to other features and sub-combinations. This is contemplated by and is within the scope of the claims.

As many possible embodiments may be made of the assembly of this invention without departing from the scope thereof, it is to be understood that all matter herein set forth or shown in the accompanying drawings is to be interpreted as illustrative and not in a limiting sense.

We claim:

1. A subterranean well tubular connection comprising: a coupling including an inner surface, a first box end and an opposite box end, a pin end of a first tubular member engaged in the first box end of the coupling, a pin end of a second tubular member engaged in the opposite box end of the coupling and a shoulder ring installed between the pin ends, said shoulder ring including a metal tube of a preselected length, with substantially parallel ends, said tube having coupling mating threads on at least part of the outer surface to engage box threads on the inner surface of said coupling, between said pin ends, said tube of such preselected length that each said pin end will engage one of said ends when the assembly of the connection is complete, and wherein said mating threads comprise a shallow, well rounded, thread form arranged to receive the crests of said box threads, yet slip over said box threads when exposed to at least a preselected axial force against said shoulder ring.

2. The subterranean well tubular connection according to claim 1 wherein said shoulder ring has a bore approximating the bore one of said pin ends and an outer diameter that is approximately the largest that will pass through the bore of the coupling.

3. The subterranean well tubular connection according to claim 1 wherein said preselected length is selected to fit in the space between said pins in the coupling being used in the assembly.

4. A subterranean well tubular connection comprising: a coupling including a central bore defining an inner surface, a first box end and an opposite box end, a pin end of a first tubular member engaged in the first box end of the coupling, a pin end of a second tubular member engaged in the opposite box end of the coupling and a shoulder ring installed between the end of said pins, the shoulder ring including a cylindrical metal tube of a preselected length, thickness and inner diameter, with substantially parallel planar ends, said tube having axially displaceable threads to engage threads on the inner surface of said coupling, between said pin ends, said tube of such preselected said length that each said pin end will engage one of said ends with a preselected axial force when the assembly of the connection, according to a preselected torque level, is complete, and wherein said axially displaceable threads comprise a shallow, well rounded, thread form arranged to receive the crests of threads in the bore of said coupling, yet slip over said threads in said coupling when exposed to at least a preselected axial force against said shoulder ring.

5. The subterranean well tubular connection according to claim 4 wherein said shoulder ring has a bore approximating the bore of the related pipe and an outer diameter that is approximately the largest that will pass through the coupling bore.

6. The subterranean well tubular connection according to claim 4 wherein said preselected length is selected to fit in the space between said pins in the coupling being used in the assembly.

* * * * *